UNITED STATES PATENT OFFICE.

ELIUS FREDERICK EICHHOLTZ, OF CONWAY, WASHINGTON, ASSIGNOR OF ONE-THIRD TO OSCAR BALL, OF McMURRAY, WASHINGTON.

INSECTICIDE.

SPECIFICATION forming part of Letters Patent No. 626,153, dated May 30, 1899.

Application filed February 8, 1899. Serial No. 704,890. (No specimens.)

*To all whom it may concern:*

Be it known that I, ELIUS FREDERICK EICHHOLTZ, of Conway, in the county of Skagit and State of Washington, have invented a new and improved composition of matter to be used as a poison to exterminate scales, larvæ, and other insects injurious to vegetation, of which the following is a full, clear, and exact specification.

My composition consists of the following ingredients, combined in about the proportions stated: flour of sulphur, one pound; carbonate of iron, four ounces; charcoal, four ounces; blue-stone, four ounces. These ingredients are thoroughly mixed to form a powder.

In using the composition a small quantity thereof—say about one-twentieth of an ounce to one and one-half ounces, according to the size of the shrub, tree, or other infected plant—is placed into a hole bored in the plant, preferably at the trunk or stem, and the outer end of the hole is then plugged up and sealed with grafting-wax or other suitable material. The composition of matter confined in the hole is dissolved and taken up by the sap of the plant and circulated to all parts thereof and discharged through the pores of the bark, thus destroying the insect infesting the plant by the insect feeding on the poisonous matter. The application when made during the active season—say from Aprli to October—produces the best results.

Having thus fully described my invention, I claim as new and desire to secure by Letters Patent—

The composition of matter, consisting of flour of sulphur, carbonate of iron, charcoal and blue-stone, in about the proportions specified.

ELIUS FREDERICK EICHHOLTZ.

Witnesses:
   OSCAR BALL,
   ED. A. BALL.